(12) United States Patent
Skertic

(10) Patent No.: US 10,378,438 B2
(45) Date of Patent: Aug. 13, 2019

(54) REVERSE FLOW GAS TURBINE ENGINE WITH RADIALLY OUTWARD TURBINE

(71) Applicant: Rolls-Royce North American Technologies, Inc., Indianapolis, IN (US)

(72) Inventor: Richard Joseph Skertic, Carmel, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 487 days.

(21) Appl. No.: 15/134,089

(22) Filed: Apr. 20, 2016

(65) Prior Publication Data
US 2017/0306841 A1    Oct. 26, 2017

(51) Int. Cl.
*F02C 7/36* (2006.01)
*F02C 3/073* (2006.01)

(52) U.S. Cl.
CPC ............. *F02C 3/073* (2013.01); *F02C 7/36* (2013.01); *F05D 2220/32* (2013.01); *F05D 2260/4031* (2013.01)

(58) Field of Classification Search
CPC .......... F02C 3/073; F02C 3/145; F02C 3/045; F02C 7/36; F02C 7/08; F05D 2220/32
See application file for complete search history.

(56) References Cited

U.S. PATENT DOCUMENTS

| | | | | |
|---|---|---|---|---|
| 2,548,975 A * | 4/1951 | Hawthorne | | F02C 3/073 415/79 |
| 3,186,166 A * | 6/1965 | Grieb | | F01D 11/04 415/116 |
| 4,141,212 A * | 2/1979 | Koschier | | F02C 3/145 60/39.511 |
| 6,397,577 B1 * | 6/2002 | Sondergaard | | F01D 5/03 415/79 |
| 6,966,174 B2 | 11/2005 | Paul | | |
| 7,874,802 B2 | 1/2011 | Suciu et al. | | |
| 7,959,406 B2 | 6/2011 | Suciu et al. | | |
| 8,726,635 B1 * | 5/2014 | Dale | | F02C 3/073 60/269 |
| 8,950,171 B2 | 2/2015 | Suciu et al. | | |
| 2003/0192303 A1 | 10/2003 | Paul | | |
| 2003/0192304 A1 | 10/2003 | Paul | | |
| 2004/0025490 A1 | 2/2004 | Paul | | |
| 2011/0146226 A1 * | 6/2011 | Wood | | F02C 7/10 60/39.511 |
| 2012/0111018 A1 | 5/2012 | Norris et al. | | |
| 2014/0230443 A1 * | 8/2014 | Plante | | F02C 3/073 60/767 |
| 2016/0222814 A1 * | 8/2016 | Sheridan | | F01D 9/041 |

* cited by examiner

*Primary Examiner* — Jason D Shanske
*Assistant Examiner* — Joshua R Beebe
(74) *Attorney, Agent, or Firm* — Shumaker & Sieffert, P.A.

(57) ABSTRACT

A gas turbine engine includes a propulsor, a compressor comprising a compressor rotor, and a turbine comprising a turbine rotor fixedly mechanically coupled to the compressor rotor. The propulsor and the compressor are arranged in axial flow series. The turbine rotor is radially outward of the compressor rotor, and the direction of fluid flow through the turbine is generally opposite the direction of gas flow through the propulsor and the compressor.

11 Claims, 1 Drawing Sheet

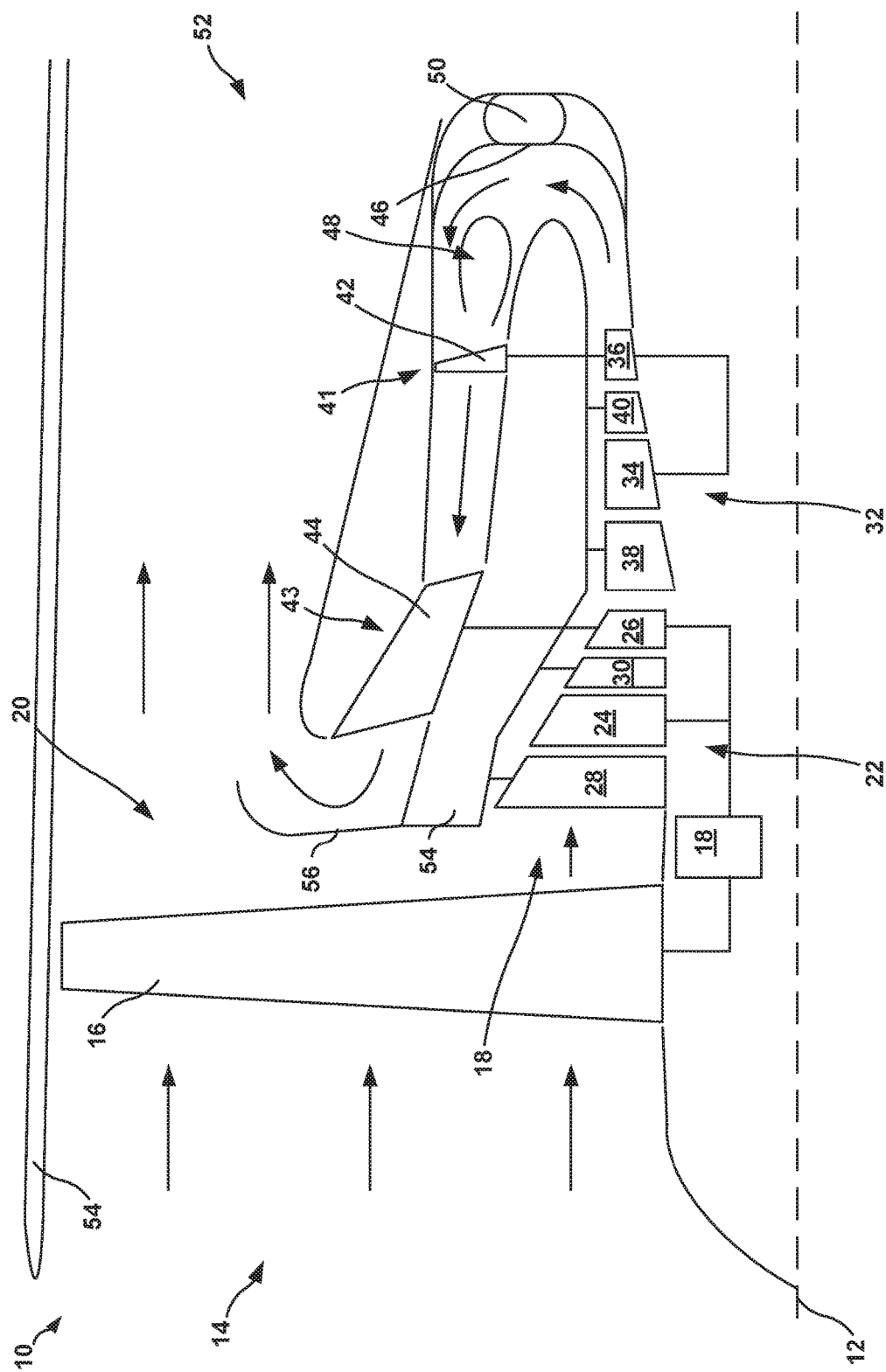

REVERSE FLOW GAS TURBINE ENGINE WITH RADIALLY OUTWARD TURBINE

TECHNICAL FIELD

The disclosure relates to gas turbine engines.

BACKGROUND

Gas turbine engines include compressors that compress fluid flowing through the compressors, a combustor in which fuel is injected into the fluid and the mixture combusted, and turbines for extracting work from the hot combustion products and driving the compressors and a propulsor. The compressors, combustor, and turbines are arranged in axial serial flow, such that fluid flows enters the gas turbine engine, flows through the compressors, then the combustor, then the turbines before exiting the gas turbine engine. In many cases, respective combustors are joined to respective turbines using respective shafts. Thus, gas turbine engines that include multiple compressors and multiple turbines include multiple shafts, which may be arranged coaxially and nested within each other.

SUMMARY

In some examples, the disclosure describes a gas turbine engine includes a propulsor, a compressor comprising a compressor rotor, and a turbine comprising a turbine rotor fixedly mechanically coupled to the compressor rotor. The propulsor and the compressor are arranged in axial flow series. The turbine rotor is radially outward of the compressor rotor, and the direction of fluid flow through the turbine is generally opposite the direction of gas flow through the propulsor and the compressor.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is a conceptual diagram illustrating a portion of an example gas turbine engine including a turbine on compressor reverse flow architecture.

DETAILED DESCRIPTION

The disclosure describes a gas turbine engine including a turbine on compressor reverse flow architecture. A gas turbine engine includes a propulsor, a compressor, a combustor, and a turbine. In accordance with this disclosure, a compressor rotor of the compressor and a turbine rotor of the turbine are fixedly mechanically coupled to each other, and the turbine rotor is radially outward of the compressor rotor. For example, the turbine rotor may include a plurality of turbine blades, and respective turbine blades may be fixedly mechanically coupled to respective compressor blades. As another example, the turbine rotor may include a plurality of turbine blades attached to each other and the turbine rotor may be attached to the compressor rotor, which may include a plurality of compressor blades. The turbine rotor may define a shape that is generally annular.

By having the turbine rotor radially outward of the compressor rotor, the length, and thus weight, of the gas turbine engine may be reduced. Further, the shaft joining the turbine rotor and the compressor rotor may be omitted, which may reduce weight of the gas turbine engine. By omitting the shaft, the discs to which the compressor blades are attached may be stronger, which may permit higher blade speeds. Higher blade speeds may increase efficiency of the gas turbine engine. Additionally or alternatively, the increased strength due to omitting the shaft may reduce bending of the compressor rotor blades, the turbine rotor blades, or both, clearance between blade tips and corresponding shrouds or tracks may be reduced, leading to reduced fluid leakage around the blade tips and increased efficiency.

FIG. 1 is a conceptual diagram illustrating a portion of an example gas turbine engine 10 including a turbine on compressor reverse flow architecture. In the example shown in FIG. 1, gas turbine engine 10 is a ducted fan gas turbine engine, and includes a principal and rotational axis 12. Although only the half of gas turbine engine 10 above principal and rotational axis 12, gas turbine engine 10 may be substantially symmetrical about principal and rotational axis 12 for purposes of this disclosure.

Gas turbine engine 10 includes, in axial flow series, a fluid intake 14, a propulsor 16, an engine intake 18, a low pressure compressor 22, and a high pressure compressor 32. Gas turbine engine 10 also includes a combustor 48, a high-pressure turbine 41, a low pressure turbine 43. Gas turbine engine 10 also includes a bypass duct 20 and an exhaust 52. Propulsor 16 is circumferentially surrounded by a fan casing 54, which may be supported by an annular array of outlet guide vanes (not shown in FIG. 1).

In gas turbine engine 10, fluid entering intake 14 is accelerated by propulsor 16 to produce two fluid flows: a first fluid flow into low pressure compressor 22 and a second fluid flow which passes through bypass duct 20 to provide propulsive thrust. Low pressure compressor 22 compresses the fluid flow directed into it. Low pressure compressor 22 includes at least one low pressure compressor rotor 24, 26, which each includes a plurality of low pressure compressor blades. Low pressure compressor 22 also includes at least one low pressure compressor stator 28, 30, which each includes a plurality of low pressure compressor vanes. First low pressure compressor rotor 24 includes a first plurality of low pressure compressor blades, and second low pressure compressor rotor 26 includes a second plurality of low pressure compressor blades. First low pressure compressor stator 28 includes a first plurality of low pressure compressor vanes, and second low pressure compressor stator 30 includes a second plurality of low pressure compressor vanes.

The example shown in FIG. 1 includes two low pressure compressor rotors 24, 26 and two low pressure compressor stators 28, 30, and the rotors 24, 26 and stators 28, 30 are interleaved. Each pair of one low pressure compressor rotor and one low pressure compressor stator may be referred to as a low pressure compressor stage (e.g., first low pressure compressor rotor 24 and first low pressure compressor stator 28, and second low pressure compressor rotor 26 and second low pressure compressor stator 30). Although FIG. 1 illustrates a low pressure compressor 22 that includes two low pressure compressor stages, low pressure compressor 22 may include any number of low pressure compressor stages, such as at least one low pressure compressor stage.

First and second low pressure compressor stators 28 and 30 are fixedly mechanically coupled to a stationary structure 54 (such as a nacelle) of gas turbine engine 10, and do not rotate during operation of gas turbine engine 10.

First and second low pressure compressor rotors 24 and 26 may be fixedly mechanically coupled to each other (e.g., via a disc), and rotate in concert with each other during operation of gas turbine engine 10. First and second low pressure compressor rotors 24 and 26 may be fixedly mechanically coupled to each other using any type of fixed mechanical connection, including, for example, rivets, bolts, welds, brazes, or the like; or may be integrally formed, e.g., using forging, casting, material addition, or the like.

Further, first and second low pressure compressor rotors 24 and 26 are mechanically coupled to a gearbox 18, e.g., by a shaft or one or more gears. Gearbox 18 converts speed, torque, or both of low pressure compressor rotors 24 and 26 into torque and speed desired to drive propulsor 16. By connecting first and second low pressure compressor rotors 24 and 26 to propulsor 16 through gearbox 18, rotational speeds of first and second low pressure compressor rotors 24 and 26 may be different (e.g., higher) than the rotational speed of propulsor 18. Gearbox 18 may be, for example, a mechanical gearbox or an electromagnetic gearbox.

The low pressure compressor blades and the low pressure compressor vanes may include any suitable construction and geometry. In some examples, at least one of the low pressure compressor blades or the low pressure compressor vanes may include a variable geometry.

Low pressure compressor 22 compresses fluid directed into it, then exhausts the compressed fluid, which is delivered to high pressure compressor 32. High pressure compressor 32 further compresses the fluid. High pressure compressor 32 includes at least one high pressure compressor rotor 34, 36. High pressure compressor 32 also includes at least one high pressure compressor stator 38, 40. First high pressure compressor rotor 34 includes plurality of high pressure compressor blades, and the second high pressure compressor rotor 36 includes plurality of high pressure compressor blades. First high pressure compressor stator 38 includes plurality of high pressure compressor vanes, and second high pressure compressor stator 40 includes plurality of high pressure compressor vanes.

The example shown in FIG. 1 includes two high pressure compressor rotors and two high pressure compressor stators, and the rotors and stators are interleaved. Each pair of one high pressure compressor rotor and one high pressure compressor stator may be referred to as a high pressure compressor stage. Although FIG. 1 illustrates a high pressure compressor 32 that includes two high pressure compressor stages, high pressure compressor 32 may include any number of high pressure compressor stages, such as at least one high pressure compressor stage.

High pressure compressor blades 34, 36 and high pressure compressor vanes 38, 40 may include any suitable construction and geometry. In some examples, at least one of high pressure compressor blades 34 or 36, or high pressure compressor vanes 38 or 40 may include a variable geometry.

First and second high pressure compressor stators 38 and 40 are fixedly mechanically coupled to a stationary structure 54 (such as a nacelle) of gas turbine engine 10, and do not rotate during operation of gas turbine engine 10.

First and second high pressure compressor rotors 34 and 36 may be fixedly mechanically coupled to each other (e.g., via a disc), and rotate in concert with each other during operation of gas turbine engine 10. First and second high pressure compressor rotors 34 and 36 may be fixedly mechanically coupled to each other using any type of fixed mechanical connection, including, for example, rivets, bolts, welds, brazes, or the like; or may be integrally formed, e.g., using forging, casting, material addition, or the like.

The compressed fluid exhausted from high pressure compressor 32 is directed at structure 46, which is configured to cause fluid, after flowing through high pressure compressor 32, to reverse flow direction prior to flowing through high pressure turbine 41. As shown in FIG. 1, structure 46 may include a bend that extends through approximately 180 degrees (e.g., a U-shaped bend) to cause fluid to reverse flow direction prior to flowing through high pressure turbine 41.

In some examples, as shown in FIG. 1, a gas turbine engine 10 includes a recuperator 50 positioned at or near structure 46. Recuperator 50 may be a counter-flow energy recovery heat exchanger that recovers excess heat in an exhaust stream (e.g., fluid exiting through exhaust 52) and heats fluid exiting high pressure compressor 32 prior to the fluid entering combustor 48. In this way, recuperator 50 may improve efficiency of gas turbine engine 10 by reducing the fuel required to heat the fluid prior to high pressure turbine 41. By including structure 46 configured to cause fluid, after flowing through high pressure compressor 32, to reverse flow direction prior to flowing through high pressure turbine 41, gas turbine engine 10 may include a suitable location for recuperator 50. In some examples, gas turbine engine 10 may omit recuperator 50.

After flowing past structure 46 and optional recuperator 50, fluid enters combustor 48. At combustor 48, the compressed fluid is mixed with fuel and the mixture combusted. The resultant hot combustion products then expand through and drive high pressure turbine 41. High pressure turbine 41 includes a high pressure turbine rotor 42, which includes a plurality of high pressure turbine blades. In some examples, high pressure turbine 41 also may include a high pressure turbine stator that includes a plurality of high pressure turbine vanes, although this is not shown in FIG. 1.

High pressure turbine 41 is located radially outward of high pressure compressor 32. Further, high pressure turbine rotor 42 is fixedly mechanically coupled to high pressure compressor 32 in the example of FIG. 1. For example, high pressure turbine rotor 42 may be fixedly mechanically coupled to high pressure compressor rotor 36. Because the first high pressure compressor rotor 34 is fixedly mechanically coupled to second high pressure compressor rotor 36, high pressure turbine rotor 42 is indirectly fixedly mechanically coupled to first high pressure compressor rotor 34.

The hot combustion products cause high pressure turbine rotor 42 to rotate, which in turn causes high pressure compressor rotors 34 and 36 to rotate. In this way, high pressure turbine 41 drives high pressure compressor 32.

In many gas turbine engines, the high pressure turbine rotor is coupled to the high pressure compressor rotor by a high pressure spool shaft extending along the long axis of the gas turbine engine, as the high pressure turbine and the high pressure compressor are arranged in axial series flow. The high pressure spool shaft contributes to the weight of the gas turbine engine, and is generally concentric with a low pressure spool shaft. The concentric shafts may be complicated to design and implement, may reduce strength of discs to which the compressor and turbine blades are attached, and contribute to bending and other deflection away from ideal rotation of the compressor and turbine rotors.

In contrast, in the current disclosure, high pressure turbine rotor 42 is radially outward from high pressure compressor 32 and is fixedly mechanically coupled to second high pressure compressor rotor 36. This allows gas turbine engine 10 to omit the high pressure spool shaft, and avoid at least some of the potential issues caused by presence of a high pressure spool shaft (e.g., shaft break issues).

High pressure turbine rotor 42 may be fixedly mechanically coupled to high pressure compressor 32 (e.g., second high pressure compressor rotor 36) using any suitable technique. For example, individual blades of high pressure turbine rotor 42 may be fixedly mechanically coupled to respective blades of second high pressure compressor rotor 36 using, e.g., rivets, bolts, welds, brazes, or the like; or individual blades of high pressure turbine rotor 42 may be integrally formed with respective blades of second high pressure compressor rotor 36 using, e.g., forging, casting, material addition, or the like. As another example, high pressure turbine rotor 42 may be formed to include a plurality of blades, and the high pressure turbine rotor 42 may be attached to second high pressure compressor rotor 36 using, e.g., rivets, bolts, welds, brazes, or the like; or high pressure turbine rotor 42 may be integrally formed with second high pressure compressor rotor 36 using, e.g., forging, casting, material addition, or the like. Although high pressure turbine rotor 42 is illustrated as being fixedly mechanically coupled to second high pressure compressor rotor 36, in other examples, high pressure turbine rotor 42 may be fixedly mechanically coupled to first high pressure compressor rotor 34.

As shown in FIG. 1, in some examples, a single high pressure turbine rotor 42 may drive multiple high pressure compressor rotors 34, 36. In other examples, gas turbine engine 10 may include a single high pressure compressor rotor, and a single high pressure turbine rotor may be fixedly mechanically coupled to the single high pressure compressor rotor and drive the high pressure compressor rotor.

After exiting high pressure turbine 41, the hot combustion products expand through and drive low pressure turbine 43. Low pressure turbine 43 includes a low pressure turbine rotor 44, which includes a plurality of low pressure turbine blades. In some examples, low pressure turbine 43 also may include a low pressure turbine stator that includes a plurality of low pressure turbine vanes, although this is not shown in FIG. 1.

Low pressure turbine 43 is located radially outward of low pressure compressor 22. Further, low pressure turbine rotor 44 is fixedly mechanically coupled to low pressure compressor 22 (e.g., second low pressure compressor rotor 26). Because first low pressure compressor rotor 24 is fixedly mechanically coupled to second low pressure compressor rotor 26, low pressure turbine rotor 44 is indirectly fixedly mechanically coupled to first low pressure compressor rotor 24.

The hot combustion products cause low pressure turbine rotor 44 to rotate, which in turn causes low pressure compressor rotors 24 and 26 to rotate. In this way, low pressure turbine rotor 44 drives low pressure compressor rotors 24 and 26.

In many gas turbine engines, the low pressure turbine rotor is coupled to the low pressure compressor rotor by a low pressure spool shaft extending along the long axis of the gas turbine engine, as the low pressure turbine and the low pressure compressor are arranged in axial series flow. The low pressure spool shaft contributes to the weight of the gas turbine engine, and is generally concentric with the high pressure spool shaft. The concentric shafts may be complicated to design and implement, may reduce strength of discs to which the compressor and turbine blades are attached, and contribute to bending and other deflection away from ideal rotation of the compressor and turbine rotors.

In contrast, in the current disclosure, low pressure turbine rotor 44 is radially outward from low pressure compressor 22 and is fixedly mechanically coupled to low pressure compressor 22. This allows gas turbine engine 10 to omit the low pressure spool shaft, and avoid at least some of the potential issues caused by presence of a low pressure spool shaft (e.g., shaft break issues).

Low pressure turbine rotor 44 may be fixedly mechanically coupled to low pressure compressor 22 (e.g., second low pressure compressor rotor 26) using any suitable technique. For example, individual blades of low pressure turbine rotor 44 may be fixedly mechanically coupled to respective blades of second low pressure compressor rotor 26 using, e.g., rivets, bolts, welds, brazes, or the like; or individual blades of low pressure turbine rotor 44 may be integrally formed with respective blades of second low pressure compressor rotor 26 using, e.g., forging, casting, material addition, or the like. As another example, low pressure turbine rotor 44 may be formed to include a plurality of blades, and the low pressure turbine rotor 44 may be attached to second low pressure compressor rotor 26 using, e.g., rivets, bolts, welds, brazes, or the like; or low pressure turbine rotor 44 may be integrally formed with second low pressure compressor rotor 26 using, e.g., forging, casting, material addition, or the like. Although low pressure turbine rotor 44 is illustrated as being fixedly mechanically coupled to second low pressure compressor rotor 26, in other examples, low pressure turbine rotor 44 may be fixedly mechanically coupled to first low pressure compressor rotor 24.

As shown in FIG. 1, in some examples, a single low pressure turbine rotor 44 may drive multiple low pressure compressor rotors 24, 26. In other examples, gas turbine engine 10 may include a single low pressure compressor rotor, and a single low pressure turbine rotor may be fixedly mechanically coupled to the single low pressure compressor rotor and drive the low pressure compressor rotor.

After exiting low pressure turbine 43, the combustion products encounter another structure configured to cause the combustion products to reverse flow direction. Structure 56 may include a bend that extends through approximately 180 degrees (e.g., a U-shaped bend) to cause the combustion products to reverse flow direction prior to combining with fluid flow through bypass duct 20. The fluid flow through bypass duct 20 and the combustion products then exhaust together through exhaust 52. By including a mixed exhaust 52 (through which bypassed fluid and combustion products exit), gas turbine engine 10 may possess improved noise and performance characteristics compared to gas turbine engines that include separate exhaust for bypassed fluid and combustion products.

Gas turbine engine 10 may provide one or more advantages compared to gas turbine engines in which the compressors and turbines are arranged in axial series flow. For example, by omitting the low pressure spool shaft, which is concentric with the high pressure spool shaft in gas turbine engines in which the compressors and turbines are arranged in axial series flow, the discs to which compressor blades and turbine blades are attached or coupled may be made stronger, as the discs do not need to allow a shaft to pass therethrough. Stronger discs may allow use of higher blade speeds due to the higher strength, may be lower weight to accomplish similar strength, or both. Further, stronger discs may deflect or deform less under high rotational speeds, which may allow reduced gaps between blade tips and blade tracks or shrouds located radially outward from the blade tips.

As another example, as all high speed components (high pressure compressor 32 and high pressure turbine 41) are located toward the exhaust side of gas turbine engine 10, in some examples, a high speed gearbox and high speed gearbox accessories may be located in a tail cone near principal and rotational axis 12 on the exhaust side of the high pressure compressor 32, which may avoid radial drive losses, reduce weight, and reduce heat generation compared to gas turbine engines in which the high speed gearbox and high speed gearbox accessories are located radially outward from the high speed components.

As an additional example, by locating high pressure turbine 41 and low pressure turbine radially outward from high pressure compressor 32 and low pressure compressor 22, in some examples, the length of gas turbine engine 10 may be reduced compared to gas turbine engines in which the turbines and compressors are arranged in axial series flow. This may contribute to reduced weight of gas turbine engine 10 compared to other gas turbine engines that include turbines and compressors arranged axial series flow.

As a further example, by locating high pressure turbine 41 and low pressure turbine radially outward from high pressure compressor 32 and low pressure compressor 22, in some examples, the turbine rotors 42 and 44 may rotate faster at design speed for the discs to which the turbine rotors 42 and 44 are fixedly mechanically attached via the respective compressor rotors 26, 36.

Various examples have been described. These and other examples fall within the scope of the following claims.

What is claimed is:

1. A gas turbine engine comprising:
   a propulsor;
   a compressor comprising:
      a low pressure compressor comprising a plurality of low pressure compressor rotors interleaved with a plurality of low pressure compressor stators;
      a high pressure compressor comprising a high pressure compressor rotor, wherein the propulsor, the low pressure compressor, and the high pressure compressor are arranged in axial flow series;
   a turbine comprising:
      a low pressure turbine comprising a single low pressure turbine rotor fixedly mechanically coupled to the plurality of low pressure compressor rotors, wherein the single low pressure turbine rotor is radially outward of the plurality of low pressure compressor rotors, and wherein the single low pressure turbine rotor drives the plurality of low pressure compressor rotors;
      a high pressure turbine comprising a high pressure turbine rotor, wherein the high pressure turbine rotor is fixedly mechanically coupled to the high pressure compressor rotor, wherein the high pressure turbine rotor is radially outward of the high pressure compressor rotor, and wherein the direction of fluid flow through the turbine is generally opposite the direction of gas flow through the propulsor and the compressor; and
   a gearbox, wherein the propulsor is mechanically coupled to the gearbox, wherein the gearbox is mechanically coupled to the low pressure compressor rotor, wherein the gas turbine engine does not include a shaft joining the low pressure turbine rotor and the low pressure compressor rotor, and wherein the gas turbine engine does not include a shaft joining the high pressure turbine rotor and the high pressure compressor rotor.

2. The gas turbine engine of claim 1, further comprising a structure configured to cause fluid, after flowing through the compressor, to reverse flow direction prior to flowing through the turbine.

3. The gas turbine engine of claim 2, further comprising a combustor in flow series between the compressor and the turbine.

4. The gas turbine engine of claim 2, further comprising a recuperator adjacent to the structure configured to cause fluid to reverse flow direction.

5. The gas turbine engine of claim 1, further comprising a structure configured to cause fluid, after flowing through the turbine, to reverse flow direction.

6. The gas turbine engine of claim 5, wherein the gas turbine engine is configured to cause the fluid that flows through the turbine to join fluid that bypasses the turbine and the compressor prior to exiting the gas turbine engine.

7. The gas turbine engine of claim 1, wherein the high pressure compressor comprises a plurality of high pressure compressor rotors interleaved with a plurality of high pressure compressor stators.

8. The gas turbine engine of claim 7, wherein the high pressure turbine comprises a single high pressure turbine rotor.

9. The gas turbine engine of claim 8, wherein the single high pressure turbine rotor drives the plurality of high pressure compressor rotors.

10. The gas turbine engine of claim 1, further comprising:
    a first shaft joining a first low pressure compressor rotor to a second low pressure compressor rotor; and
    a second shaft joining a first high pressure compressor rotor to a second high pressure compressor rotor.

11. A gas turbine engine comprising:
    a propulsor;
    a compressor comprising:
       a low pressure compressor comprising a first low pressure compressor rotor and a second low pressure compressor rotor joined by a first shaft;
       a high pressure compressor comprising a first high pressure compressor rotor and a second high pressure compressor rotor joined by a second shaft, wherein the propulsor, the low pressure compressor, and the high pressure compressor are arranged in axial flow series;
    a turbine comprising:
       a low pressure turbine comprising a low pressure turbine rotor fixedly mechanically coupled to one of the first or second low pressure compressor rotors, wherein the low pressure turbine rotor is radially outward of first and second low pressure compressor rotors;
       a high pressure turbine comprising a high pressure turbine rotor, wherein the high pressure turbine rotor is fixedly mechanically coupled to one of the first or second high pressure compressor rotors, wherein the high pressure turbine rotor is radially outward of the first and second high pressure compressor rotor, and wherein the direction of fluid flow through the turbine is generally opposite the direction of gas flow through the propulsor and the compressor; and
    a gearbox, wherein the propulsor is mechanically coupled to the gearbox, wherein the gearbox is mechanically coupled to the first and second low pressure compressor rotors, wherein the gas turbine engine does not include a shaft joining the low pressure turbine rotor and the low pressure compressor rotor, and wherein the gas turbine engine does not include a shaft joining the high pressure turbine rotor and the high pressure compressor rotor.

\* \* \* \* \*